US012683638B2

(12) United States Patent (10) Patent No.: US 12,683,638 B2
Lin et al. (45) Date of Patent: Jul. 14, 2026

(54) NODE AND METHODS PERFORMED BY THE NODE IN A WIRELESS COMMUNICATION NETWORK

(71) Applicant: Samsung Electronics Co., Ltd., Gyeonggi-do (KR)

(72) Inventors: Peng Lin, Beijing (CN); Di Su, Beijing (CN); Chen Qian, Beijing (CN)

(73) Assignee: Samsung Electronics Co., Ltd (KR)

( * ) Notice: Subject to any disclaimer, the term of this patent is extended or adjusted under 35 U.S.C. 154(b) by 291 days.

(21) Appl. No.: 18/400,608

(22) Filed: Dec. 29, 2023

(65) Prior Publication Data

US 2024/0223232 A1 Jul. 4, 2024

(30) Foreign Application Priority Data

Dec. 30, 2022 (CN) .......................... 202211739965.3

(51) Int. Cl.
H04B 1/10 (2006.01)
H04B 1/04 (2006.01)

(52) U.S. Cl.
CPC ......... H04B 1/1027 (2013.01); H04B 1/0475 (2013.01)

(58) Field of Classification Search
CPC ............................ H04B 1/1027; H04B 1/0475
See application file for complete search history.

(56) References Cited

U.S. PATENT DOCUMENTS

2017/0041165 A1    2/2017  Cheng et al.
2021/0006286 A1 *  1/2021  Moorti ..................... H04B 1/12

2022/0352915 A1 *  11/2022  Abedini ................. H01Q 21/06
2023/0421188 A1 *  12/2023  Anis ..................... H04B 1/1036

FOREIGN PATENT DOCUMENTS

WO      WO 2021/177664        9/2021

OTHER PUBLICATIONS

Ahmed Masmoudi et al., "Self-Interference Cancellation for Full-Duplex MIMO Transceivers", ResearchGate, Jun. 2015, 6 pages.
Leo Laughlin et al., "In-Band Full-Duplex in Hand-held Applications: Analysis of Canceller Tuning Requirements", 2018 Wireless Advanced (WIAD), Jun. 26-28, 2018, 6 pages.
Ali Behravan et al., "Introducing Sensing into Future Wireless Communication Systems", IEEE International Symposium on Joint Communications & Sensing, Mar. 31, 2022, 5 pages.
International Search Report dated Apr. 2, 2024 issued in counterpart application No. PCT/KR2023/022002, 11 pages.

* cited by examiner

*Primary Examiner* — Justin Y Lee
(74) *Attorney, Agent, or Firm* — The Farrell Law Firm, P.C.

(57) ABSTRACT

The present disclosure provides a method and apparatus for receiving signals in a wireless communication network. The method includes performing a first self-interference cancellation on a time domain baseband signal; performing a sensing-related detection on the time domain baseband signal after the first self-interference cancellation; determining whether to perform a second self-interference cancellation based on a sensing-related detection result; if it is determined to perform the second self-interference cancellation based on the sensing-related detection result, performing at least one second self-interference cancellation on the time domain baseband signal.

15 Claims, 11 Drawing Sheets

NODE AND METHODS PERFORMED BY THE NODE IN A WIRELESS COMMUNICATION NETWORK

CROSS-REFERENCE TO RELATED APPLICATION(S)

This application is based on and claims priority under 35 U.S.C. § 119 to Chinese Patent Application No. 202211739965.3, filed in the Chinese Patent Office on Dec. 30, 2022, the disclosure of which is incorporated by reference herein in their entirety.

BACKGROUND

1. Field

The present disclosure relates generally to the field of wireless communication, and more particularly, to a node and methods performed by the node in a wireless communication network.

2. Description of Related Art

Fifth generation (5G) mobile communication technologies define broad frequency bands such that high transmission rates and new services are possible, and can be implemented not only in "Sub 6 gigahertz (GHz)" bands such as 3.5 gigahertz (GHz), but also in "Above 6 GHz" bands referred to as millimeter wave (mmWave) including 28 GHz and 39 GHz. In addition, implementing sixth generation (6G) mobile communication technologies (referred to as Beyond 5G systems) in terahertz (THz) bands (for example, 95 GHz to 3 THz bands) has been considered in order to accomplish transmission rates fifty times faster than 5G mobile communication technologies and ultra-low latencies one-tenth of 5G mobile communication technologies.

Since the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple input multiple output (MIMO) for mitigating radio-wave path loss and increasing radio-wave transmission distances in mmWave, supporting numerologies (for example, operating multiple subcarrier spacings) for efficiently utilizing mm Wave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

There are ongoing discussions regarding improvement and performance enhancement of initial 5G mobile communication technologies in view of services to be supported by 5G mobile communication technologies, and there has been physical layer standardization regarding technologies such as vehicle to everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, new radio (NR) user equipment (UE) power saving, non-terrestrial network (NTN) which is UE-satellite direct communication for providing coverage in an area in which communication with terrestrial networks is unavailable, and positioning.

Moreover, there is also ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service(s) regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary.

To this end, new research is scheduled in connection with extended Reality (XR) for efficiently supporting augmented reality AR, virtual reality (VR), mixed reality (MR), 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in THz bands of 6G mobile communication technologies, multi-antenna transmission technologies such as full dimensional MIMO (FD-MIMO), array antennas and large-scale antennas, metamaterial-based lenses and antennas for improving coverage of THz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

The present disclosure has been made to address the above-mentioned challenges, and to provide at least the advantages described below.

According to an embodiment, a method performed by a first node includes obtaining a time domain baseband signal; performing a first self-interference cancellation on the obtained time domain baseband signal; performing sensing-related detection on the first self-interference cancelled time domain baseband signal; determining whether to perform a second self-interference cancellation based on a sensing-related detection result; and in case that the second self-interference cancellation is determined to be performed, performing second self-interference cancellation on a time domain baseband signal related to target points.

According to another embodiment, a method performed by a first node includes receiving self-interference cancellation parameter configuration information configured by a second node; and performing self-interference cancellation based on the received self-interference cancellation parameter configuration information.

According to another embodiment, a method performed by a second node includes obtaining self-interference cancellation parameter configuration information for a first node performing self-interference cancellation; and transmitting the self-interference cancellation parameter configuration information to the first node.

According to another embodiment, first node in a wireless communication network includes a transceiver; at least one processor; and a memory storing one or more programs configured to be executed by the at least one processor and including instructions for controlling the first node to perform operations including obtaining a time domain baseband signal; performing a first self-interference cancellation on the obtained time domain baseband signal; performing sensing-related detection on the first self-interference cancelled time domain baseband signal; determining whether to perform a second self-interference cancellation based on a sensing-related detection result; and in case that the second self-interference cancellation is determined to be performed, performing second self-interference cancellation on a time domain baseband signal related to target points.

According to another embodiment, a second node in a wireless communication network includes a transceiver; at least one processor; and a memory storing one or more programs configured to be executed by the at least one processor and including instructions for controlling the first node to perform operations including obtaining self-interference cancellation parameter configuration information for the first node to perform self-interference cancellation; and transmitting the self-interference cancellation parameter configuration information to the first node.

The present disclosure implements high-precision target sensing by designing a method performed by a node in a wireless communication network and the node.

BRIEF DESCRIPTION OF THE DRA WINGS

The above and other aspects, features, and advantages of embodiments of the disclosure will be more apparent from the following description taken in conjunction with the accompanying drawings, in which.

DETAILED DESCRIPTION

The following description with reference to the drawings is provided to facilitate a comprehensive understanding of various embodiments of the disclosure defined by the claims and their equivalents. This description includes various specific details to facilitate understanding but should only be considered as exemplary. Therefore, those skilled in the art will recognize that various changes and modifications can be made to various embodiments described herein without departing from the scope and spirit of the disclosure. In addition, for the sake of clarity and conciseness, descriptions of well-known functions and structures may be omitted.

The terms and expressions used in the following specification and claims are not limited to their dictionary meanings, but are only used to enable a clear and consistent understanding of the disclosure. Therefore, it should be obvious to those skilled in the art that the following descriptions of various embodiments of the disclosure are provided for illustration purposes only and are not intended to limit the purposes of the disclosure as defined in the appended claims and their equivalents.

It should be understood that singular forms of "a", "an" and "the" include plural referents unless the context clearly indicates otherwise. Thus, for example, a reference to a "component surface" includes a reference to one or more such surfaces.

The terms "include" or "may include" refer to the existence of corresponding disclosed functions, operations or components that may be used in various embodiments of the disclosure, without limiting the existence of one or more additional functions, operations or features. In addition, the terms "include" or "have" can be interpreted as indicating certain characteristics, numbers, steps, operations, constituent elements, components or combinations thereof, but should not be interpreted as excluding the possibility of the existence of one or more other characteristics, numbers, steps, operations, constituent elements, components or combinations thereof.

The term "or" used in various embodiments of the disclosure includes any of the listed terms and all combinations thereof. For example, "A or B" may include A, may include B, or may include both A and B.

Unless defined differently, all terms (including technical terms or scientific terms) used in this disclosure have the same meaning understood by those understood by those skilled in the art as described in this disclosure. General terms, as defined in dictionaries, are interpreted as having meanings consistent with the context in the relevant technical fields, and should not be interpreted in an idealized or overly formal way unless explicitly defined in this disclosure.

Figure 1:
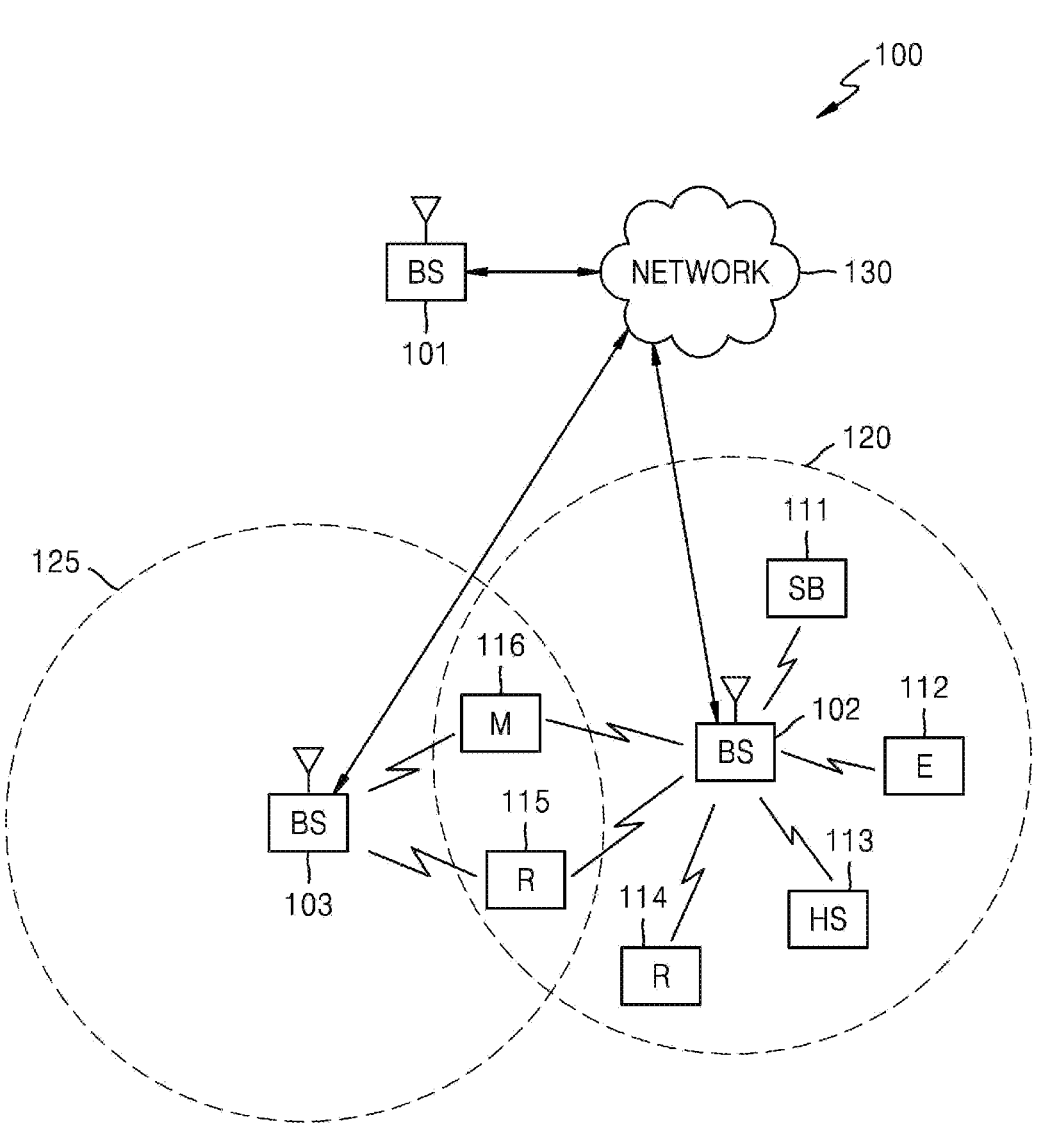
FIG. 1 illustrates an example wireless network, according to an embodiment of the disclosure.

FIG. 1 illustrates an example wireless network, according to an embodiment of the disclosure. The embodiment of the wireless network 100 shown in FIG. 1 is for illustration only. Other embodiments of the wireless network 100 can be used without departing from the scope of the disclosure.

Referring to FIG. 1, the wireless network 100 includes a gNB 101, a gNB 102, and a gNB 103. The gNB 101 communicates with gNB 102 and gNB 103. gNB 101 also communicates with at least one Internet protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of UEs within a coverage area 120 of gNB 102. The first plurality of UEs include a UE 111, which may be located in a small business (SB); a UE 112, which may be located in an enterprise (E); a UE 113, which may be located in a wireless-fidelity (Wi-Fi) hotspot (HS); a UE 114, which may be located in a first residence (1R); a UE 115, which may be located in a second residence (2R); a UE 116, which may be a mobile device (M), such as a cellular phone, a wireless laptop computer, a wireless personal digital assistant (PDA), etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, long term evolution (LTE), LTE-advanced (LTE-A), worldwide interoperability for microwave access (WiMAX) or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a two-dimensional (2D) antenna array as described in embodiments of the disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
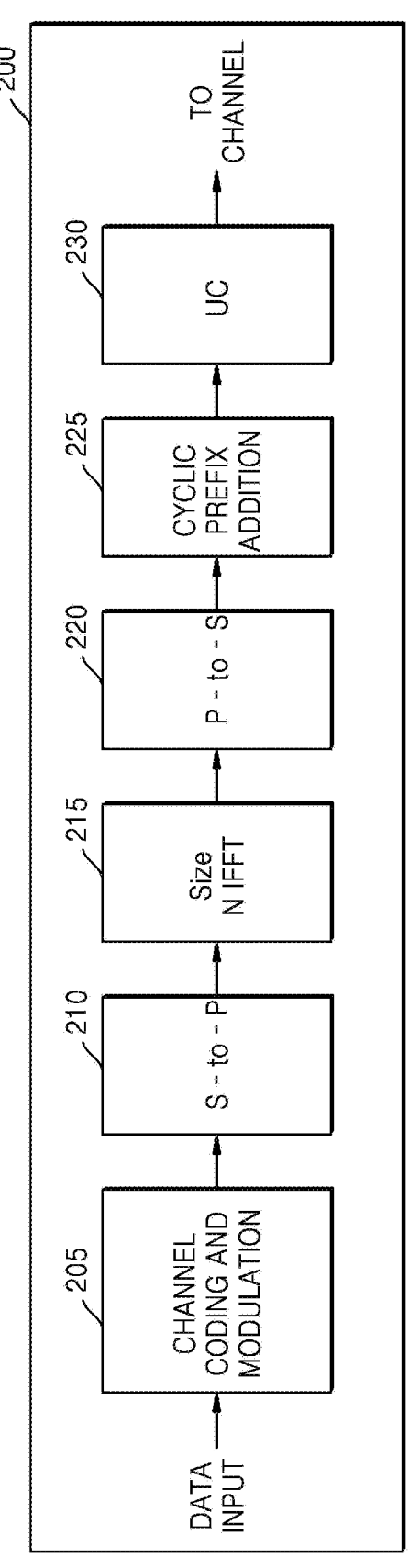
FIG. 2A illustrates example wireless transmission and reception paths, according to an embodiment the disclosure.
Figure 2B:
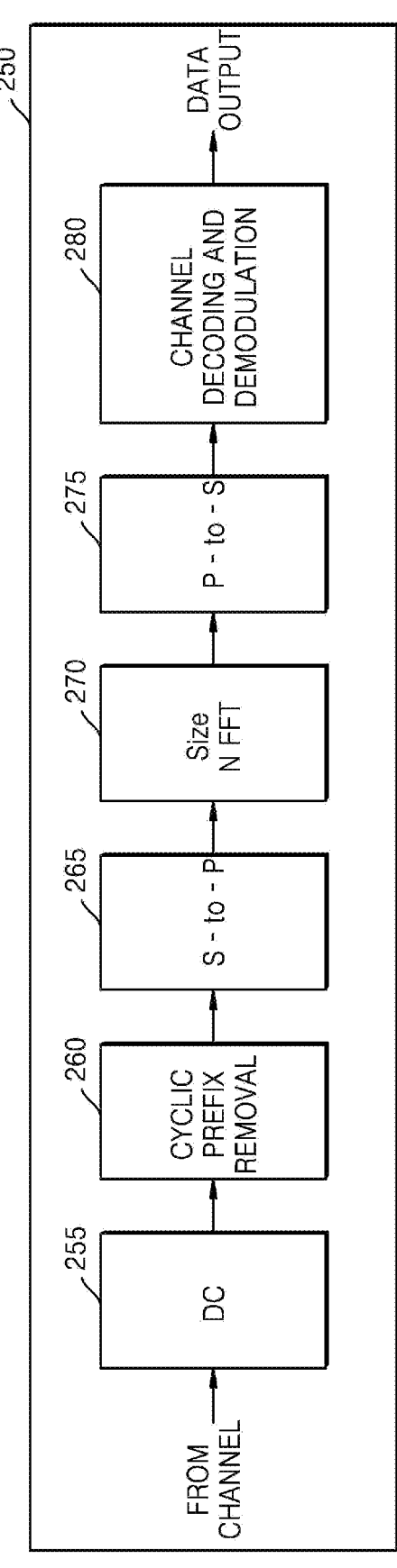
FIG. 2B illustrates example wireless transmission and reception paths, according to an embodiment of the disclosure.

FIGS. 2A and 2B illustrate example wireless transmission and reception paths, according to embodiments of the disclosure.

Referring to FIGS. 2A-2B, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the disclosure.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, an S-to-P block 265, a size N fast Fourier transform (FFT) block 270, a P-to-S block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or quadrature amplitude modulation (QAM)) to generate a sequence of frequency-domain modulated symbols. The S-to-P block 210 converts (demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time domain output signal. The P-to-S block 220 converts (multiplexes) parallel time domain output symbols from the Size N IFFT block 215 to generate a serial time domain signal. The cyclic prefix addition block 225 inserts a cyclic prefix into the time domain signal. The UC 230 modulates (UCs) the output of the cyclic prefix addition block 225 to a radio frequency (RF) for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The DC 255 down-converts the received signal to a baseband frequency, and the cyclic prefix removal block 260 removes the cyclic prefix to generate a serial time domain baseband signal. The S-to-P block 265 converts the time domain baseband signal into a parallel time domain signal. The Size N FFT block 270 performs an FFT algorithm to generate N parallel frequency-domain signals. The P-to-S block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as discrete Fourier transform (DFT) and inverse discrete Fourier transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
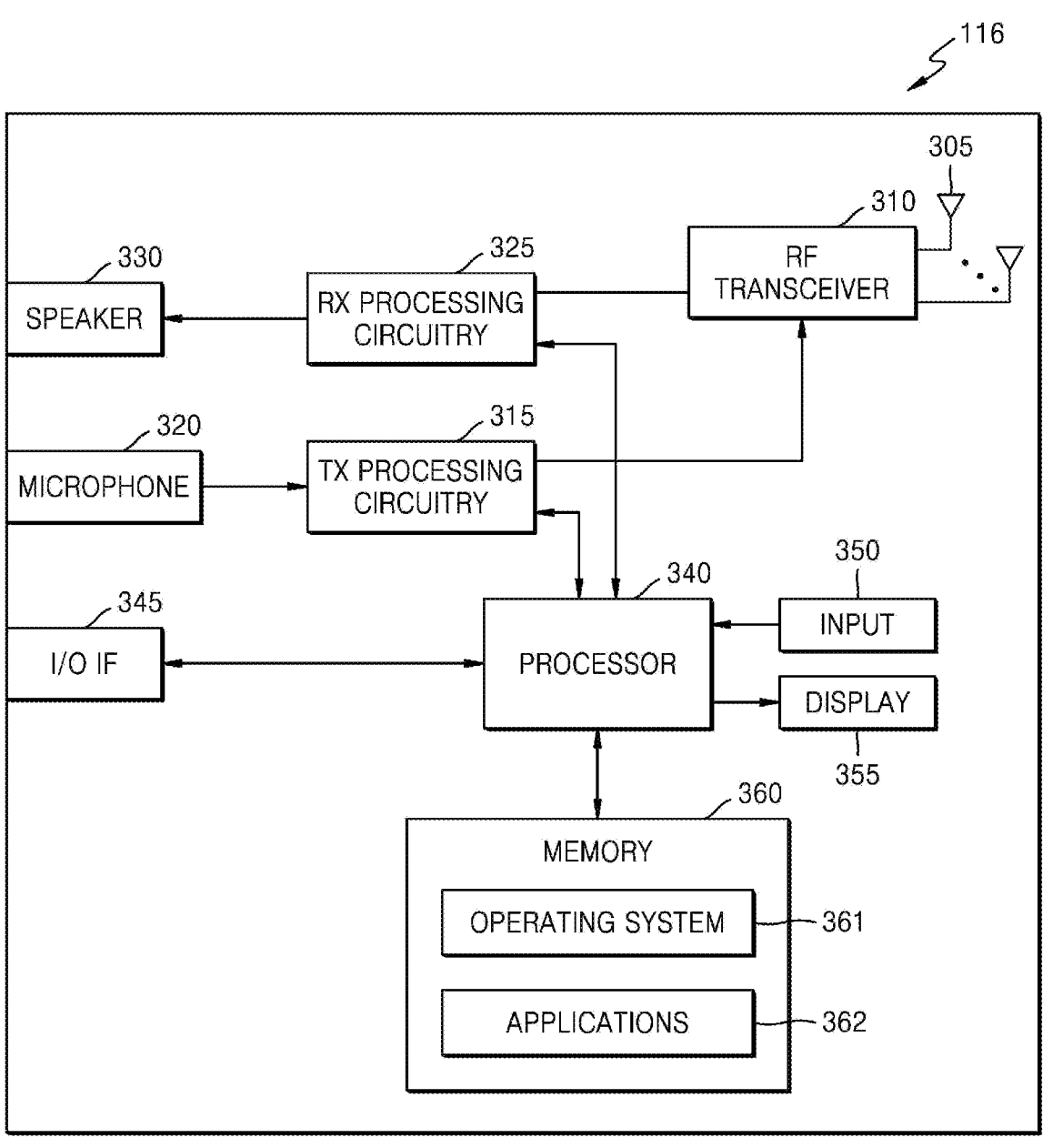
FIG. 3A illustrates an example UE, according to an embodiment of the disclosure.

FIG. 3A illustrates an example UE, according to an embodiment of the disclosure. The embodiment of UE 116 shown in FIG. 3A is for illustration only, and UEs 111-115 of FIG. 1 can have the same or a similar configuration. However, a UE has various configurations, and FIG. 3A does not limit the scope of the disclosure to any specific implementation of the UE.

Referring to FIG. 3A, UE 116 includes an antenna 305, an RF transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactivated video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and perform an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 can move data into or out of the memory 360 as required by an execution process. In some embodiments, the processor/controller 340 is configured to perform the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
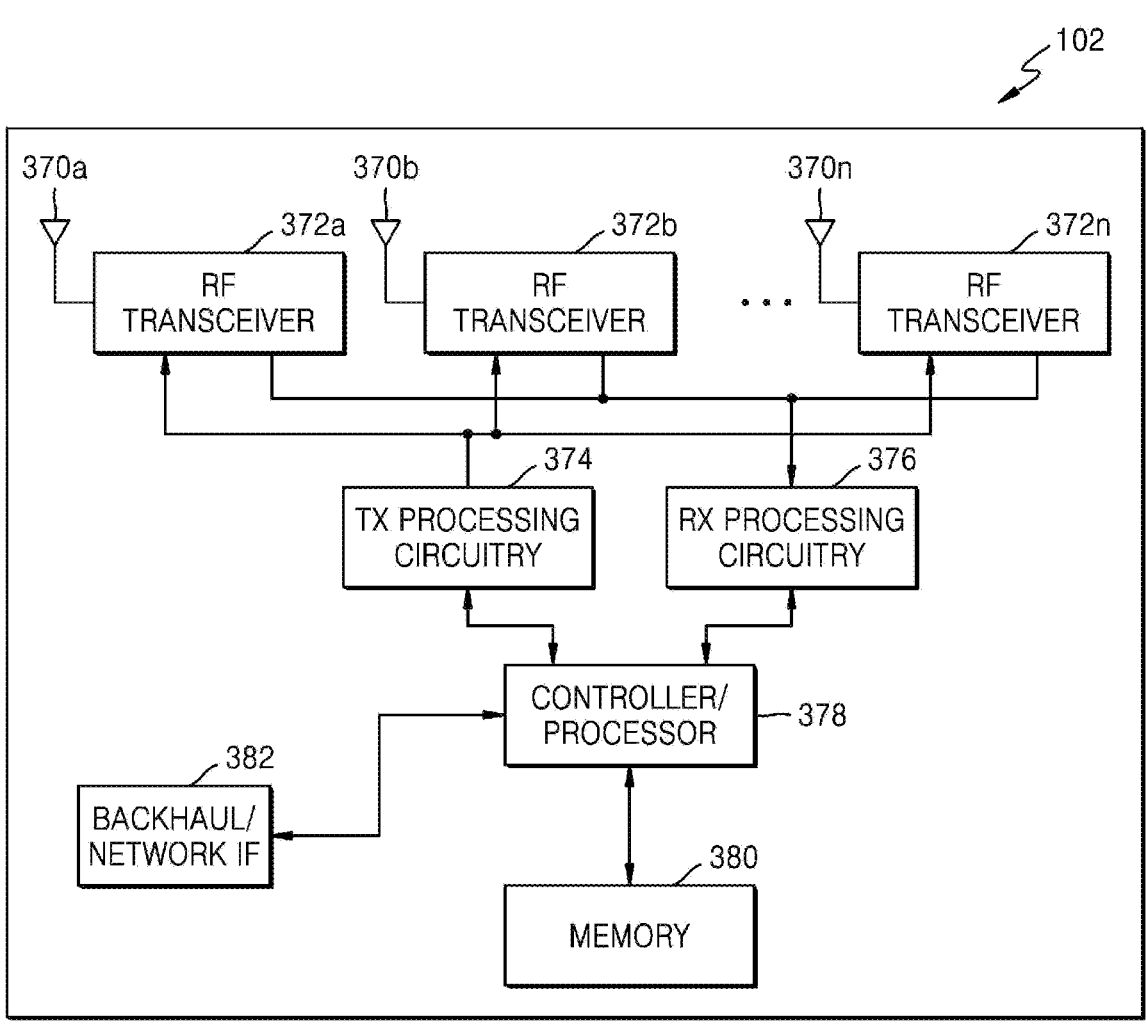
FIG. 3B illustrates an example base station (gNB), according to an embodiment of the disclosure.

FIG. 3B illustrates an example gNB, according to an embodiment of the disclosure. The embodiment of gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that gNB 101 and gNB 103 can include the same or similar structures as gNB 102.

As shown in FIG. 3B, gNB 102 includes a plurality of antennas 370a-370n, a plurality of RF transceivers 372a-372n, a TX processing circuit 374, and a RX processing circuit 376. In certain embodiments, one or more of the plurality of antennas 370a-370n include a 2D antenna array. gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or base-band signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interacti-vated video game data) from the controller/processor 378. TX processing circuit 374 encodes, multiplexes and/or digi-tizes outgoing baseband data to generate a processed base-band or IF signal. RF transceivers 372a-372n receive the outgoing processed baseband or IF signal from TX process-ing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wire-less communication functions. For example, the controller/processor 378 can perform a blind interference sensing (BIS) process such as that performed through a BIS algo-rithm, and decode a received signal from which an interfer-ence signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodi-ments of the disclosure. In some embodiments, the control-ler/processor 378 supports communication between entities such as web real time communications (RTCs). The con-troller/processor 378 can move data into or out of the memory 380 as required by an execution process.

The controller/processor 378 is also coupled to the back-haul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF trans-ceiver.

The memory 380 is coupled to the controller/processor 378. A part of the memory 380 can include an RAM, while another part of the memory 380 can include a flash memory or other ROMs. In certain embodiments, a plurality of indication(s), such as the BIS algorithm, are stored in the memory. The plurality of indication(s) is configured to cause the controller/processor 378 to perform the BIS process and decode the received signal after subtracting at least one interference signal determined by the BIS algorithm.

As will be described in more detail below, the transmis-sion and reception paths of gNB 102 (implemented using RF transceivers 372a-372n, TX processing circuit 374 and/or RX processing circuit 376) support aggregated commu-nication with frequency domain duplex (FDD) cells and time domain duplex (TDD) cells.

Although FIG. 3B illustrates an example of gNB 102, various changes may be made to FIG. 3B. For example, gNB 102 can include any number of each component shown in FIG. 3B. As a specific example, the access point can include many backhaul or network interfaces 382, and the control-ler/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

Exemplary embodiments of the disclosure are further described below with reference to the accompanying draw-ings.

Text and drawings are provided as examples only to help readers understand the disclosure. They are not intended and should not be construed to limit the scope of the disclosure in any way. Although certain embodiments and examples have been provided, based on the disclosure herein, it is obvious to those skilled in the art that changes can be made to the illustrated embodiments and examples without depart-ing from the scope of this disclosure.

How to improve the spectrum utilization rate of a com-munication system has been a hotspot issue for practitioners. With the development of the operating frequency bands of communication systems towards high frequency, resource conflicts between communication systems and radar systems at high frequency band may occur. However, there are very high similarities between communication systems and radar systems in terms of background theoretical knowledge and hardware structure, so theoretically, two seemingly indepen-dent systems may be integrated to enhance functions of communication systems and improve spectrum efficiency, thereby achieving mutual benefit. Therefore, communica-tion sensing integration is a popular research direction in the communication field, and it is also one of the candidate technologies of 6G. The core purpose of a communication sensing integration system is to use the same set of hardware devices to enable the sensing function of surrounding envi-ronment at the expense of as little resources as possible on the basis of ensuring the basic communication function. Contents of sensing includes distance, orientation, speed and even type of an object in the surrounding environment. Different from the technology of locating an access terminal in a traditional communication system, the communication sensing integration technology can further enable the sensing of various information of a non-access object, which greatly increases the ability of the communication system to dynamically adjust working state (scheduling, beam management, early warning of an access terminal, etc.) according to the surrounding environment.

In the potential application scenario of communication sensing integration technology, compared with the independent radar system, the device with communication sensing integration capability usually does not have a particularly high signal transmission power, so the device with communication sensing integration capability can usually only sense the environment in a close range (for example, hundreds of meters), thus the echo signal in the environment (the received signal reflected or scattered by the transmitted signal through the target point in the environment) needs to be received by the receiver at the same time when the signal is transmitted, which requires the communication sensing integration technology to require the nodes that sense the environment to have a full duplex capability (full duplex may be defined as transmitting and receiving at the same time with the same frequency). From the analysis of the propagation characteristics of electromagnetic waves, the signal energy directly leaked from the transmitter to the receiver and the echo signal energy of the near object may be much higher than those of the distant target, and if interference is not eliminated, these high-energy signals will have a great impact on the recognition of distant targets and weak scattering targets. Based on this relationship, interference cancellation may be the basis to ensure the smooth detection of distant targets and weak scattering targets in the environment, and it also may be the enabling technology to ensure the normal work of the communication sensing integration system.

In order to reduce the complexity of implementation, the conventional digital domain self-interference cancellation technology will complete the complex operations related to the self-interference channel that have nothing to do with the dynamic received signal offline and store them in the storage resources of hardware, although this implementation method can reduce the complexity of estimating the self-interference channel, the parameters of self-interference channel estimation need to be set in advance and cannot be dynamically adjusted according to actual needs. This shortcoming will limit the sensing ability of the sensing device in the communication sensing integration scenario. In the scenario of communication sensing integration, there may be some strong scattering target points that are not within the pre-set range of self-interference cancellation, however, due to the relatively high power of these strong scattering points, the power of their own nonlinear components may also be above the noise floor, which will have the side effect of raising the noise floor, which will have an impact on the detection of distant targets or weak scattering targets. However, since the appearance and location of these strong scattering points cannot be determined in advance, if the conventional self-interference cancellation method is adopted, the number of estimated paths in self-interference channel estimation must be greatly increased to improve the probability of covering these strong scattering points, however, this method will greatly reduce the sensing range (because the useful information deleted will also increase with the increase of the number of self-interference deletion paths). Therefore, in the communication sensing integration technology, the self-interference deletion technology must have the ability to dynamically adjust parameters according to actual needs.

The method described herein can be performed by a first node in a wireless communication system, wherein the first node can include, but is not limited to, a UE, a BS, a relay node, an IAB node, etc.

Figure 4:
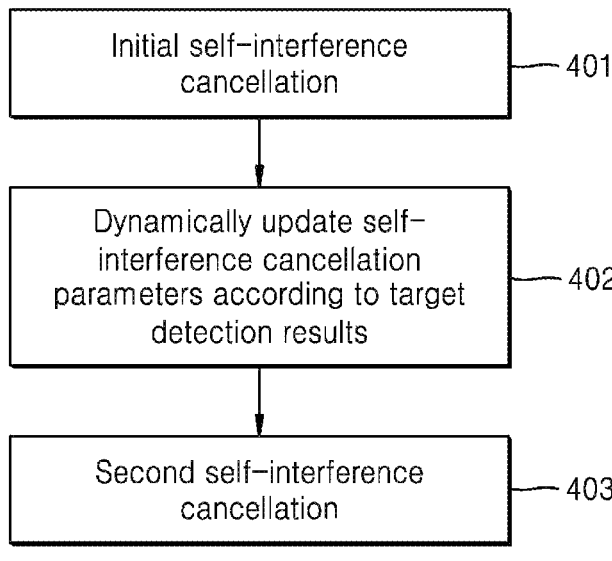
FIG. 4 illustrates a flowchart of a method for the digital domain self-interference cancellation, according to an embodiment of the disclosure.

FIG. 4 illustrates a flowchart of a method for the digital domain self-interference cancellation, according to an embodiment of the disclosure.

Referring to FIG. 4, the method for the digital domain self-interference cancellation includes performing initial self-interference cancellation on the received time domain baseband signal in step 401; performing target detection on the signal after initial self-interference cancellation, and dynamically updating the self-interference cancellation parameters according to the detection results in step 402; and performing at least one second self-interference cancellation according to the updated self-interference cancellation parameters in step 403. The self-interference cancellation parameters in the above process may include the set of path numbers for self-interference cancellation.

In the method described with reference to FIG. 4, the target detection on the signal after initial self-interference cancellation refers to the sensing-related detection of the time domain baseband signal after initial self-interference cancellation, so as to update the self-interference cancellation parameters and determine target points requiring the second self-interference cancellation. After obtaining the updated self-interference cancellation parameters, the method determines whether to perform second self-interference cancellation based on the updated self-interference cancellation parameters. Furthermore, in the case of determining to perform the second self-interference cancellation based on the updated self-interference cancellation parameters, at least one second self-interference cancellation is performed for the time domain baseband signal or at least one second self-interference cancellation is performed for the time domain baseband signal after initial self-interference cancellation.

With reference to the method for the digital domain self-interference cancellation described in FIG. 4, the self-interference cancellation parameters can be dynamically adjusted according to actual requirements, and then the information of the interference that needs to be deleted can be dynamically obtained, so as to avoid the influence of strong scattering target points that are not within the range of the preset self-interference cancellation on the detection of distant targets or weak scattering targets in the communication sensing integration scenario, thereby realizing high-precision target sensing in the observation scenario with lower hardware implementation complexity.

Figure 5:
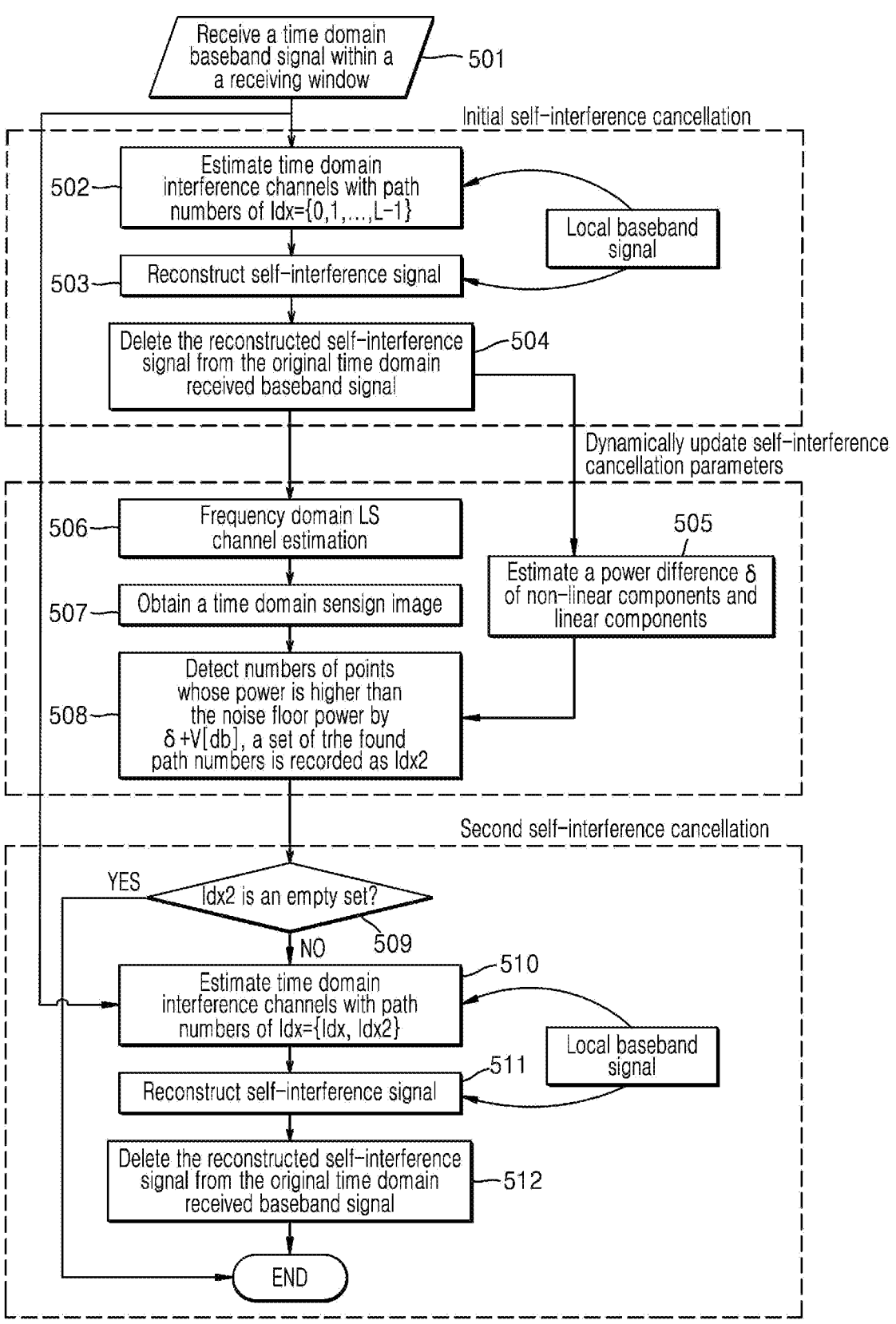
FIG. 5 illustrates a flowchart of a receiver of a first node for the digital domain interference cancellation, according to an embodiment of the disclosure.

FIG. 5 illustrates a flowchart of a receiver of a first node for the digital domain interference cancellation, according to an embodiment of the disclosure.

Referring to FIG. 5, the flow of the receiver begins with receiving a time domain baseband signal within a receiving window in step 501. Then, the receiver implements the digital domain self-interference cancellation of the time domain baseband signal through the following steps.

Initial self-interference cancellation is performed. In step 502, time domain interference channels are estimated with path. This may include parameter utilization.

Suppose that the time domain received signal in the receiving window is y[n], where $n=0, 1, N_{FFT}-1$, $N_{FFT}$ is the size of Fourier transform, and the vector form of y[n] is given by Equation 1 as follows:

$$y = \begin{bmatrix} y[0] \\ \vdots \\ y[N_{FFT} - 1] \end{bmatrix} \qquad \text{Equation 1}$$

Where L is the number of paths for initial self-interference cancellation, then the set of path numbers for initial self-interference cancellation is $Idx=\{0, 1, \ldots, L-1\}$. L corresponds to the blind area of the communication sensing integration system one by one, and can be preset or configured by the parent node of the device. For example, if the communication sensing integration device is a terminal, L can be preset, configured by the base station to which it accesses through downlink control information (DCI), configured by media access control (MAC) signaling, and configured by high layer signaling.

Assume that the local time domain signal used for self-interference cancellation is s[n], where n=0, 1, $N_{FFT}-1$, the first-order component time domain convolution matrix $S_1$ constructed by s[n] is given by Equation 2 as follows:

$$S_1 = \begin{bmatrix} s[0] & s[N_{FFT} - 1] & \ldots & s[2] & s[1] \\ s[1] & s[0] & \ldots & s[3] & s[2] \\ \vdots & \vdots & \ddots & \vdots & \vdots \\ s[N_{FFT} - 2] & s[N_{FFT} - 3] & \ldots & s[0] & s[N_{FFT} - 1] \\ s[N_{FFT} - 1] & s[N_{FFT} - 2] & \ldots & s[1] & s[0] \end{bmatrix} \quad \text{Equation 2}$$

That is, the first column of $S_1$ is s[n], and each column afterward is a downward cyclic shift of the previous column. Furthermore, the time domain convolution matrices of the third-order component and the fifth-order component are constructed from the first-order component time domain convolution matrix $S_1$, which are $S_3=S_1\odot|S_1|^2$ and $S_5=S_1 \odot|S_1|^4$, respectively, where $|\cdot|^2$ and $|\cdot|^4$ respectively represent the square and quartic of absolute values per element, (indicating the multiplication per element of the matrix, and the operation priority of $|\cdot|^2$ and $|\cdot|^4$ is higher than that of $\odot$.

The specific method for initial self-interference channel estimation may include:

① According to the cancellation order P, take out the subarrays $X_{init}$ from $S_1$, $S_3$, $S_5$, and the specific method is as follows:

If P=1, $X_{init}$ is a matrix composed of the first L columns of $S_1$.

If P=3, $X_{init}$ is a matrix composed of the first L columns of $S_1$ and the first L columns of $S_3$ in sequence.

If P=5, $X_{init}$ is a matrix composed of the first L column of $S_1$, the first L column of $S_3$ and the first L column of $S_5$ in sequence.

② Calculate the initial self-interference channel estimation $\hat{h}_{init}$, and the specific method is based on Equation 3 as follows:

$$\hat{h}_{init} = \left(X_{init}^H X_{init} + \lambda I\right)^{-1} X_{init}^H y \qquad \text{Equation 3}$$

Where $\lambda$ is a preset small non-negative number, such as 0.1, and the upper corner H indicates Hermite transposition, and I is an identity matrix. If the local signal s[n] is known by the device in advance, such as the reference signal, then for the initial self-interference channel estimation with the fixed path numbers of self-interference cancellation, $$\left(X_{init}^H X_{init} + \lambda I\right)^{-1} X_{init}^H$$

can be calculated off-line in advance and stored in the storage resources of hardware, and can be directly called and multiplied with y when self-interference channel estimation is needed, without an online dynamic calculation. The cancellation order P can be preset or configured by the parent node of the device, for example, if the communication sensing integration device is a terminal, then P can be preset, configured by the base station to which it is accessed through DCI, configured by MAC signaling, and configured by higher layered signaling.

In step 403, reconstructing the self-interference signal is performed.

According to the self-interference channel estimation $\hat{h}_{init}$ and matrix $X_{init}$ obtained, the reconstructed self-interference signal for initial self-interference cancellation can be obtained based on Equation 4 as follows:

$$y_{recon1} = X_{init}\hat{h}_{init} \qquad \text{Equation 4}$$

Initial self-interference cancellation is performed.

The residual signal after initial self-interference cancellation is provided by Equation 5 as follows:

$$y_{res1} = y - y_{recon1} \qquad \text{Equation 5}$$

The self-interference cancellation parameters are dynamically updated.

After initial self-interference cancellation, the self-interference cancellation parameters are dynamically updated by performing sensing-related detection on the time domain baseband signal after initial self-interference cancellation, wherein the self-interference cancellation parameters may include the set of path numbers for self-interference cancellation. That is, the target points that need second self-interference cancellation are determined by sensing-related detection on the time domain baseband signal after initial self-interference cancellation, and these target points constitute a set of path numbers used for second self-interference cancellation. Further, the sensing-related detection is based on the power threshold value used to determine target points of second self-interference cancellation and the power sensing result obtained by power sensing the time domain baseband signal after initial self-interference cancellation.

The power threshold value for determining the target points of second self-interference cancellation is obtained by the method described below.

Firstly, the power difference $\delta$ between the corresponding linear components and nonlinear components of the time domain baseband signal is determined, which can refer to the absolute value of the power difference value between the linear components and the nonlinear components. The specific method is described below.

The power difference $\delta$ between the linear components and the nonlinear components is calculated.

The calculation of the power difference $\delta$ between the linear components and the nonlinear components depends on the obtained self-interference cancellation order P, specifically:

(1) If the self-interference cancellation order P=3 or 5, $\delta$ can use a preset value, or be configured by a second node (such as the parent node of the first node), or can be obtained by dynamic estimation, the method of dynamic estimation determines the power difference between the linear components and the nonlinear components based on the reconstructed self-interference signal corresponding to the initial self-interference cancellation, specifically:

The first L elements and the other elements are taken out from $\hat{h}_{init}$, and recorded as $$\hat{h}_{init}^{(L)}$$

and $$\hat{h}_{init}^{(NL)}$$

respectively, representing the self-interference channels of linear components and nonlinear components respectively. Then the first L column and the other columns are taken out from $X_{init}$, and recorded as $$X_{init}^{(L)}$$

and $$X_{init}^{(NL)}$$

respectively. Finally, the power difference of the $$x_{init}^{(L)}\hat{h}_{init}^{(L)}$$

and $$x_{init}^{(NL)}\hat{h}_{init}^{(NL)}$$

is calculated, which is $\delta$, and the unit is decibel (dB).

The calculation formula of $\delta$ is given by Equation 6 as follows:

$$\delta = \left| 10\log_{10} \frac{\hat{h}_{init}^{(L)H} X_{init}^{(L)H} X_{init}^{(L)} \hat{h}_{init}^{(L)}}{\hat{h}_{init}^{(NL)H} X_{init}^{(NL)H} X_{init}^{(NL)} \hat{h}_{init}^{(NL)}} \right| \quad \text{Equation 6}$$

where the upper corner H represents conjugate transposition.

(2) If the self-interference cancellation order P=1, then $\delta$ can use a preset value or be configured by the parent node of the first node.

In the calculation process as described above, the self-interference cancellation order P=1 can be called the first order of self-interference cancellation, and the self-interference cancellation order P=3 or 5 can be called the second order of self-interference cancellation.

After determining the power difference $\delta$, the power threshold adjustment parameter V is acquired. The threshold adjustment parameter V can be used to fine-tune the power threshold value of the target point requiring the second self-interference cancellation. The typical value can be set to 0, and V can be preset or configured by the parent node of the device. For example, if the communication sensing integration device is a terminal, V can be pre-configured, configured by the base station to which it accesses through DCI, configured by MAC signaling, and configured by the high layer.

Based on the determined power difference $\delta$ and the power threshold adjustment parameter V, the power threshold value for determining the target points of second self-interference cancellation can be expressed as ($\delta$+V) dB. Accordingly, in step 504, the reconstructed self-interference signal is deleted from the original time domain received baseband signal, and the power difference $\delta$ is estimated in step 505.

Next, the power sensing on the time domain baseband signal after initial self-interference cancellation to obtain the power sensing result is described.

The frequency domain channel estimation is performed on the time domain baseband signal after initial self-interference cancellation, Performing frequency domain channel estimation on the residual signal $y_{res}$ after initial self-interference cancellation is described.

Frequency domain least square (LS) channel estimation is performed in step 506 for $y_{res1}$, for example, if the waveform is cyclic prefix orthogonal frequency division multiplexing (CP-OFDM), a Fourier transform is needed for $y_{res}$, and then the channel estimation is performed per subcarrier within the bandwidth actually occupied by the signal.

In step 507, a time domain power sensing image is obtained.

After frequency domain channel estimation, power sensing is performed based on the frequency domain channel estimation result, and the power sensing result is obtained and can be referred to as a time domain power sensing image, which includes corresponding power-related information at positions with different distances from the first node. The time domain power sensing image can be a one-dimensional matrix or array, in which each element corresponds to the power of each point in the result after the frequency domain channel estimation result is transformed into the time domain. The specific method of obtaining the time domain power sensing image includes performing size $N_{FFT}$ inverse Fourier transform on the size $N_{FFT}$ frequency domain channel estimation result and calculating the power point by point to obtain the time domain power sensing image $\hat{I}_{init}$.

After obtaining the power threshold value and the power sensing result, based on the power sensing result and the power threshold value, the target points requiring the second self-interference cancellation can be detected, and the self-interference cancellation parameters can be updated.

Detecting the target points and updating the self-interference cancellation parameters is described below.

The noise floor power of the time domain baseband signal after initial self-interference cancellation is obtained.

Traversing $\hat{I}_{init}$, all the element numbers whose power is higher than the noise floor power by at least the power threshold value are determined, and the elements corresponding to these element numbers are the detected target points that need second self-interference cancellation. The self-interference cancellation parameters are updated, which may include the set of path numbers for self-interference cancellation. In step 508, the set of all the found element numbers is recorded as Idx2. Since the self-interference signals with path numbers in Idx have been cancelled, if Idx2 is not an empty set, Idx2 and Idx do not have the same elements.

After dynamically updating the self-interference cancellation parameters by sensing-related detection on the time domain baseband signal after initial self-interference cancellation, and obtaining the path number set Idx2 for the second self-interference cancellation, the second self-interference cancellation can be performed based on the path number set Idx2, as described below.

In step 509, it is determined whether to perform the second self-interference cancellation based on the path number set Idx2. If there is no target point requiring the second self-interference cancellation, that is, if Idx2 is an empty set, it is determined not to perform the second self-interference cancellation, otherwise, the second self-interference cancellation is performed.

If Idx2 is an empty set, then the method ends, otherwise time domain interference channels are estimated in step 510.

In the method according to FIG. 5, if second self-interference cancellation is performed, at least one second self-interference cancellation is performed on the time domain baseband signal before the initial self-interference cancellation for the path number set Idx2 and the path number set Idx, as described below.

Performing second self-interference channel estimation is described below.

According to the cancellation order P, the subarrays X are taken out from $S_1$, $S_3$, $S_5$ and $X_{init}$.

If P=1, X is a matrix composed by concatenating columns indicated by all elements in the set Idx2 from among $X_{init}$ and $S_1$.

If P=3, X is a matrix composed by concatenating columns indicated by all elements in the set Idx2 from among $X_{init}$ and $S_1$ and columns indicated by all elements in the set Idx2 from among $S_3$.

If P=5, X is a matrix composed by concatenating columns indicated by all elements in the set Idx2 from among $X_{init}$ and $S_1$, columns indicated by all elements in the set Idx2 from among $S_3$ and columns indicated by all elements in the set Idx2 from among $S_5$.

The self-interference channel estimation $\hat{h}$ may be calculated according to Equation 7 as follows:

$$\hat{h} = \left(X^H X + \lambda I\right)^{-1} X^H y \qquad \text{Equation 7}$$

where the parameter $\lambda$ is the same as that in the initial self-interference channel estimation.

It can be seen that the core of self-interference channel estimation and the step that concentrates most of the computational complexity is calculating $(X^H X + \lambda I)^{-1}$. $(X^H X + \lambda I)^{-1}$ can be calculated on-line and can be calculated using the recursive methods that do not involve matrix inversion. Since the dimension of the matrix inversion is larger at this time, the implementation complexity is higher, the recursive methods are preferred for calculating $(X^H X + \lambda I)^{-1}$ at this time. The specific method of recursively calculating $(X^H X + \lambda I)^{-1}$ is as follows:

①  Initialization

Make k equal to number of columns of $X_{init}-1$, where $D_k$ is given as Equation 8 as follows:

$$D_k = \left(X_{init}^H X_{init} + \lambda I\right)^{-1} \qquad \text{Equation 8}$$

②  Calculate $D_{k+1}$

First, take out the k+1 column of X, and record it as $x_{k+1}$, and take out the first k columns of X, and record it as $X_k$.

Then calculate a projection matrix $P_k$ according to Equation 9 as follow:

$$P_k = I = X_k D_k X_k^H. \qquad \text{Equation 9}$$

Finally calculate $D_k+1$ based on Equation 10 as follows:

$$D_{k+1} = \begin{bmatrix} D_k + \dfrac{D_k X_k^H x_{k+1} x_{k+1}^H X_k D_k}{x_{k+1}^H P_k x_{k+1} + \lambda} & -\dfrac{D_k X_k^H x_{k+1}}{x_{k+1}^H P_k x_{k+1} + \lambda} \\ -\dfrac{x_{k+1}^H X_k D_k}{x_{k+1}^H P_k x_{k+1} + \lambda} & \dfrac{1}{x_{k+1}^H P_k x_{k+1} + \lambda} \end{bmatrix} \qquad \text{Equation 10}$$

③  As long as k is not equal to the number of columns of X−1, let k=k+1 and repeat step ②. Until k=the number of columns of X−1, proceed to step ④.

④  Calculate the final self-interference channel estimation using Equation 11 as follows:

$$\hat{h} = D_{k+1} X^H y \qquad \text{Equation 11}$$

In step 511, second self-interference signal reconstruction is performed.

According to the self-interference channel estimation $\hat{h}$ and matrix X obtained, the reconstructed self-interference signal for the second self-interference cancellation can be obtained based on Equation 12 as follows:

$$y_{recon2} = X\hat{h} \qquad \text{Equation 12}$$

In step 512, the reconstructed self-interference signal is deleted from the original time domain received baseband signal.

The residual signal after second self-interference cancellation is given based on Equation 13 as follows:

$$y_{res2} = y - y_{recon2} \qquad \text{Equation 13}$$

The digital domain interference cancellation method described above with reference to FIG. 5 can dynamically obtain the information of the interference that needs to be deleted, and delete the strong interference from the echo signal with high accuracy, thus ensuring that distant targets and weak scattering targets can be detected correctly.

Figure 6:
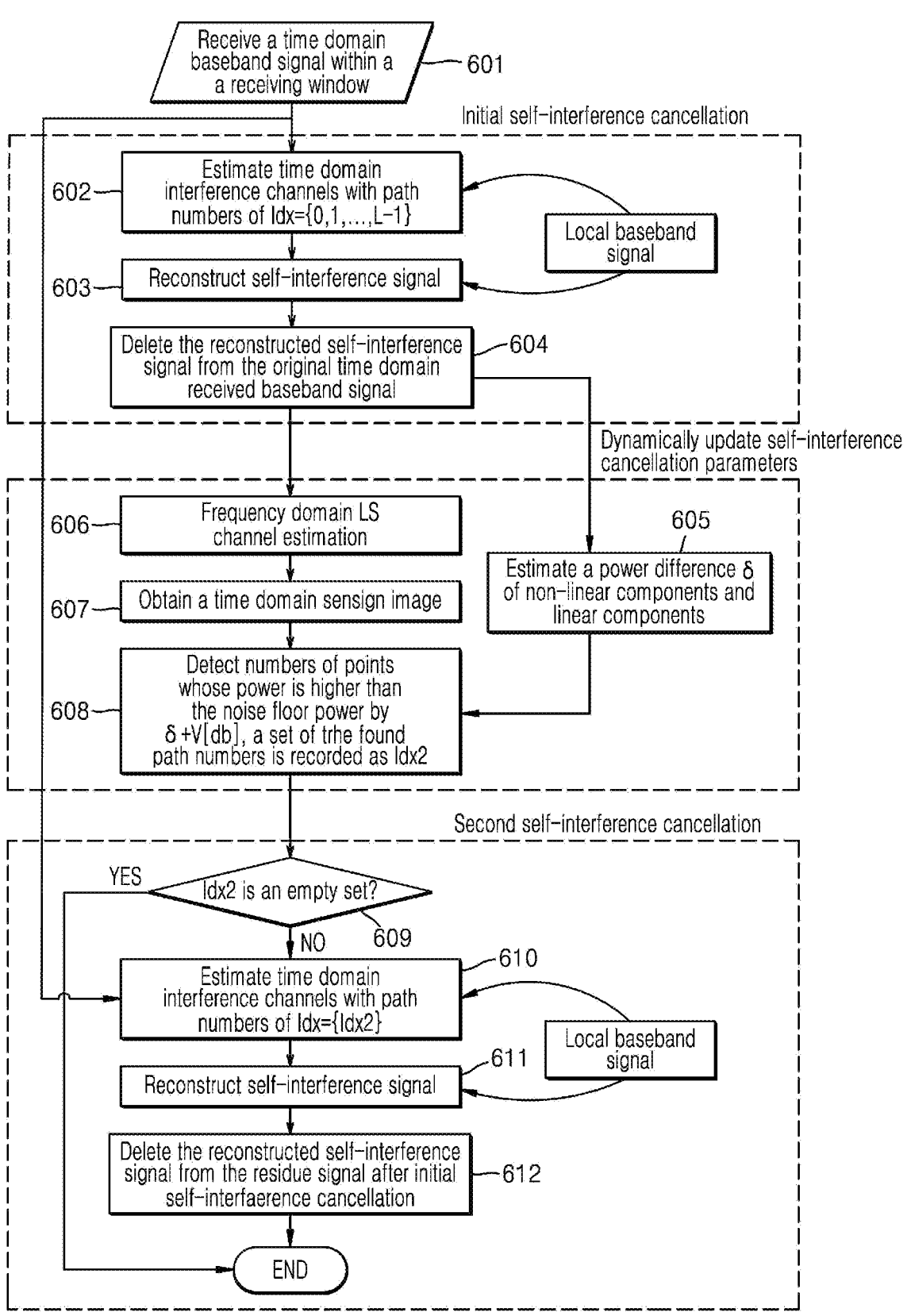
FIG. 6 illustrates a flowchart of a receiver of a first node for the digital domain interference cancellation, according to an embodiment of the disclosure.

FIG. 6 illustrates a flowchart of a receiver of a first node for the digital domain interference cancellation, according to an embodiment of the disclosure.

Referring to FIG. 6, in step 601, the receiver receives a time domain baseband signal within a receiving window. Then, the receiver implements the digital domain self-interference cancellation of the time domain baseband signal by performing an initial self-interference cancellation.

In step 602, the initial self-interference channel is estimated.

Suppose that the time domain received signal in the receiving window is y[n], where n=0, 1, $N_{FFT}-1$, $N_{FFT}$ is the size of Fourier transform, and the vector form of y[n] is provided by Equation 14 as follows:

$$y = \begin{bmatrix} y[0] \\ \vdots \\ y[N_{FFT}-1] \end{bmatrix} \qquad \text{Equation 14}$$

where L is the number of paths for initial self-interference cancellation, then the set of path numbers for initial self-interference cancellation is Idx={0, 1, . . . , L−1}. L corresponds to the blind area of the communication sensing integration system one by one, and can be preset or configured by the parent node of the device. For example, if the communication sensing integration device is a terminal, L can be preset, configured by the base station to which it accesses through DCI, configured by MAC signaling, and configured by higher layer signaling. The set of path numbers for initial self-interference cancellation is Idx= {0, 1, . . . , L−1}.

Assume that the local time domain signal used for self-interference cancellation is s[n], where n=0, 1, $N_{FFT}-1$, the first-order component time domain convolution matrix $S_1$ constructed by s[n] is provided by Equation 15 as follows:

$$S_1 = \begin{bmatrix} s[0] & s[N_{FFT}-1] & \cdots & s[2] & s[1] \\ s[1] & s[0] & \cdots & s[3] & s[2] \\ \vdots & \vdots & \ddots & \vdots & \vdots \\ s[N_{FFT}-2] & s[N_{FFT}-3] & \cdots & s[0] & s[N_{FFT}-1] \\ s[N_{FFT}-1] & s[N_{FFT}-2] & \cdots & s[1] & s[0] \end{bmatrix} \qquad \text{Equation 15}$$

That is, the first column of $S_1$ is s[n], and each column thereafter is a downward cyclic shift of the previous column. Furthermore, the time domain convolution matrices of the third-order component and the fifth-order component are constructed from the first-order component time domain convolution matrix $S_1$, which are $S_3 = S_1 \odot |S_1|^2$ and $S_5 = S_1 \odot |S_1|^4$, respectively, where $|\cdot|^2$ and $|\cdot|^4$ respectively represent the square and quartic of absolute values per element, (indicating the multiplication per element of the matrix, and the operation priority of $|\cdot|^2$ and $|\cdot|^4$ is higher than that of $\odot$.

Initial self-interference channel estimation is performed in step 602 by:

①According to the cancellation order P, take out the subarrays $X_{init}$ from $S_1$, $S_3$, and $S_5$.

If P=1, $X_{init}$ is a matrix composed of the first L columns of $S_1$.

If P=3, $X_{init}$ is a matrix composed of the first L columns of $S_1$ and the first L columns of $S_3$ in sequence.

If P=5, $X_{init}$ is a matrix composed of the first L columns of $S_1$, the first L columns of $S_3$ and the first L columns of $S_5$ in sequence.

②Calculate the initial self-interference channel estimation $\hat{h}_{init}$ according to Equation 16 as follows:

$$\hat{h}_{init} = \left(X_{init}^H X_{init} + \lambda I\right)^{-1} X_{init}^H y \qquad \text{Equation 16}$$

where $\lambda$ is a preset small non-negative number, such as 0.1, and the upper corner H indicates Hermite transposition, I is an identity matrix. If the local signal s[n] is known by the device in advance, such as the reference signal, then for the initial self-interference channel estimation with the fixed path numbers of self-interference cancellation, $$\left(X_{init}^H X_{init} + \lambda I\right)^{-1} X_{init}^H$$

can be calculated off-line in advance and stored in the storage resources of hardware, and can be directly called and multiplied with y when self-interference channel estimation is needed, without online dynamic calculation. Where L is the number of paths for initial self-interference cancellation, then the set of path numbers for initial self-interference cancellation is Idx={0, 1, . . . , L−1}. The cancellation order P can be preset or configured by the parent node of the device. For example, if the communication sensing integration device is a terminal, the value of P can be preset, configured by the base station to which it accesses through DCI, configured by MAC signaling, and configured by higher layer signaling.

In step 603, the self-interference signal is reconstructed.

According to the self-interference channel estimation $\hat{h}_{init}$ and matrix $X_{init}$ obtained, the reconstructed self-interference signal for initial self-interference cancellation can be obtained based on Equation 17 as follows:

$$y_{recon1} = X_{init}\hat{h}_{init} \qquad \text{Equation 17}$$

In step 604, the reconstructed self-interference signal is deleted from the original time domain received baseband signal.

The residual signal after initial self-interference cancellation is given by Equation 18 as follows:

$$y_{res1} = y - y_{recon1} \qquad \text{Equation 18}$$

Dynamically updating the self-interference cancellation parameters will now be described.

After initial self-interference cancellation, the self-interference cancellation parameters are dynamically updated by performing sensing-related detection on the time domain baseband signal after initial self-interference cancellation. The self-interference cancellation parameters may include the set of path numbers for self-interference cancellation. That is, the target points that need second self-interference cancellation are determined by sensing-related detection on the time domain baseband signal after initial self-interference cancellation, and these target points constitute a set of path numbers used for second self-interference cancellation. Further, the sensing-related detection is based on the power threshold value used to determine target points of second self-interference cancellation and the power sensing result obtained by power sensing the time domain baseband signal after initial self-interference cancellation.

The power threshold value for determining the target point of second self-interference cancellation is obtained.

The power difference $\delta$ between the corresponding linear components and nonlinear components of the time domain baseband signal is determined in step 605, which can refer to the absolute value of the power difference value between the linear components and the nonlinear components.

Calculating the power difference $\delta$ between linear components and nonlinear components is described below.

The calculation of the power difference $\delta$ between the linear components and the nonlinear components depends on the obtained self-interference cancellation order P, specifically:

(1) If the self-interference cancellation order is P=3 or 5, 8 can use a preset value, or be configured by a second node (such as the parent node of the first node), or can be obtained by dynamic estimation, the method of dynamic estimation determines the power difference between the linear components and the nonlinear components based on the reconstructed self-interference signal corresponding to the initial self-interference cancellation, specifically:

The first L elements and the other elements from $\hat{h}_{init}$ are taken out and recorded as $$\hat{h}_{init}^{(L)}$$

and $$\hat{h}_{init}^{(NL)}$$

respectively, representing the self-interference channels of linear components and nonlinear components respectively. Then the first L columns and other columns are taken out from $X_{init}$, and recorded as $$X_{init}^{(L)}$$

and $$X_{init}^{(NL)}$$

respectively. Finally, the power difference of the $$x_{init}^{(L)} \hat{h}_{init}^{(L)}$$

and $$x_{init}^{(L)} \hat{h}_{init}^{(NL)}$$

is calculated, which is $\delta$, and the unit is dB.

(2) If the self-interference cancellation order P=1, then $\delta$ can only use the preset value or be configured by the parent node of the first node.

In the calculation process as described above, the self-interference cancellation order P=1 can be called the first order of self-interference cancellation, and the self-interference cancellation order P=3 or 5 can be called the second order of self-interference cancellation.

After determining the power difference $\delta$, the power threshold adjustment parameter V is acquired. The threshold adjustment parameter V can be used to fine-tune the power threshold value of the target point requiring the second self-interference cancellation. The typical value can be set to 0, and V can be preset or configured by the parent node of the device. For example, if the communication sensing integration device is a terminal, V can be pre-configured, configured by the base station to which it is accessed through DCI, configured by MAC signaling, and configured by the higher layer.

Based on the determined power difference $\delta$ and the power threshold adjustment parameter V, the power threshold for determining the target points of second self-interference cancellation can be expressed as $(\delta+V)$ dB.

Next, the power sensing on the time domain baseband signal after initial self-interference cancellation to obtain the power sensing result is described.

The frequency domain channel estimation is performed on the time domain baseband signal after initial self-interference cancellation Channel estimation on the residual signal $y_{res}$ after initial self-interference cancellation is performed. In step 606, channel estimation for frequency domain LS channel for $y_{res}$ is performed. For example, if the waveform is CP-OFDM, Fourier transform is needed for $y_{res}$, and then the channel estimation is performed subcarrier by subcarrier within the bandwidth actually occupied by the signal.

In step 607, a time domain power sensing image is obtained.

After the frequency domain channel estimation, power sensing is performed based on the frequency domain channel estimation result, and the obtained power sensing result can be referred to as a time domain power sensing image, which includes corresponding power-related information at positions with different distances from the first node. The time domain power sensing image can be a one-dimensional matrix or array, in which each element corresponds to the power of each point in the result after the frequency domain channel estimation result is transformed into the time domain. The specific method of obtaining the time domain power sensing image includes performing a size $N_{FFT}$ inverse Fourier transform on the size $N_{FFT}$ frequency domain channel estimation result and calculating the power point by point to obtain the time domain power sensing image $\hat{I}_{init}$.

After obtaining the power threshold value and the power sensing result, based on the power sensing result and the power threshold value, the target points requiring the second self-interference cancellation can be detected in step 608, and the self-interference cancellation parameters can be updated.

Detecting the target points and updating the self-interference cancellation parameters is described below.

The noise floor power of the time domain baseband signal after initial self-interference cancellation is obtained.

Traversing $\hat{I}_{init}$, all the element numbers whose power is higher than the noise floor power are found by at least the power threshold value, and the elements corresponding to these element numbers are the detected target points that need second self-interference cancellation, and the self-interference cancellation parameters are updated, which may include the set of path numbers for self-interference cancellation. The set of all the found element numbers is recorded as Idx2. Since the self-interference signals with the path numbers in Idx have been cancelled, if Idx2 is not an empty set, Idx2 and Idx do not have the same elements.

After dynamically updating the self-interference cancellation parameters by sensing-related detection on the time domain baseband signal after initial self-interference cancellation, and obtaining the path number set Idx2 for the second self-interference cancellation, the second self-interference cancellation can be performed based on the path number set Idx2.

Second self-interference cancellation is described below.

In step 609, it is determined whether to perform the second self-interference cancellation based on the path number set Idx2. If there is no target point requiring the second self-interference cancellation, that is, Idx2 is an empty set, the second self-interference cancellation is not performed, otherwise, the second self-interference cancellation is performed.

If Idx2 is an empty set, then the method ends. On the other hand, if Idx2 is not an empty set, the method proceeds to step 610.

In the method according to FIG. 6, if second self-interference cancellation is performed, at least one second self-interference cancellation is performed on the time domain baseband signal after initial self-interference cancellation for the set of path numbers Idx2.

In step 610, time domain interference channels are estimated with path numbers of Idx={Idx2}. Performing second self-interference channel estimation is described below.

(1) According to the cancellation order P, the subarrays X are taken out from $S_1$, $S_3$, and $S_5$.

If P=1, X is a matrix composed by concatenating columns indicated by all elements in the set Idx2 from among $S_1$.

If P=3, X is a matrix composed by concatenating columns indicated by all elements in the set Idx2 from among $S_1$ and columns indicated by all elements in the set Idx2 from among $S_3$.

If P=5, X is a matrix composed by concatenating columns indicated by all elements in the set Idx2 from among $S_1$, columns indicated by all elements in the set Idx2 from among $S_3$ and columns indicated by all elements in the set Idx2 from among $S_5$.

(2) The self-interference channel estimation h is calculated based on Equation 19 as follows:

$$ h = \left( X^H X + \lambda I \right)^{-1} X^H y_{res1} \qquad \text{Equation 19} $$

wherein the parameters $\lambda$ are the same as those in the initial self-interference channel estimation.

It can be seen that the core of self-interference channel estimation and the step that concentrates most of the computational complexity is calculating $(X^H X + \lambda I)^{-1}$. $(X^H X + \lambda I)^{-1}$ can be calculated on-line and can be calculated using the recursive methods that do not involve matrix inversion. The hardware cost of online calculating the inverse matrix is very high, so the recursive methods are preferred for calculating $(X^H X + \lambda I)^{-1}$ at this time. The specific method of recursively calculating $(X^H X + \lambda I)^{-1}$ is described below.

①  Initialization

Let k be equal to 0, and $D_k$ is determined based on Equation 20 as follows:

$$ D_k = \frac{1}{\lambda} I \qquad \text{Equation 20} $$

②  Calculating $D_k+1$

A k+1 column is taken out of X, and recorded as $x_{k+1}$. The first k columns are taken out of X, and recorded as $X_k$.

A projection matrix $P_k$ is calculated based on Equation 21 as follows:

$$ P_k = T - X_k D_k X_k^H \qquad \text{Equation 21} $$

$D_k+1$ is calculated based on Equation 22 as follows:

$$ D_{k+1} = \begin{bmatrix} D_k + \dfrac{D_k X_k^H x_{k+1} x_{k+1}^H x_k D_k}{x_{k+1}^H P_k x_{k+1} + \lambda} & -\dfrac{D_k X_k^H x_{k+1}}{x_{k+1}^H P_k x_{k+1} + \lambda} \\ -\dfrac{x_{k+1}^H x_k D_k}{x_{k+1}^H P_k x_{k+1} + \lambda} & \dfrac{1}{x_{k+1}^H P_k x_{k+1} + \lambda} \end{bmatrix} \qquad \text{Equation 22} $$

③  As long as k is not equal to the number of columns of X−1, k=k+1 and step ② is repeated. Once k equals the number of columns of X−1, proceed to step ④.

④  Calculate the final self-interference channel estimation h based on Equation 23 as follows:

$$ \hat{h} = D_{k+1} X^H y \qquad \text{Equation 23} $$

Second self-interference signal reconstruction is performed in step 611.

According to the self-interference channel estimation $\hat{h}$ and matrix X obtained, the reconstructed self-interference signal for second self-interference cancellation can be obtained based on Equation 24 as follows:

$$ y_{recon2} = X\hat{h} \qquad \text{Equation 24} $$

The reconstructed self-interference signal is deleted from the residue signal after initial self-interference cancellation in step 612.

The residual signal after second self-interference cancellation is provided based on Equation 25 as follows:

$$ y_{res2} = y_{res1} - y_{recon2} \qquad \text{Equation 25} $$

The digital interference cancellation method described with reference to FIG. 6 can also dynamically obtain the information of the interference that needs to be deleted and can delete the strong interference from the echo signal with high accuracy, thus ensuring that the distant target and the weak scattering target can be detected correctly. Compared with the embodiment described with reference to FIG. 5, in the embodiment described with reference to FIG. 6, only the time domain interference channels with the path numbers in {Idx2} are estimated in the second self-interference cancellation, instead of the time domain interference channels with the path numbers in {Idx1, Idx2}. In this way, the computational complexity of the second self-interference channel estimation can be reduced, and the difficulty of interference cancellation can be reduced.

Figure 7:
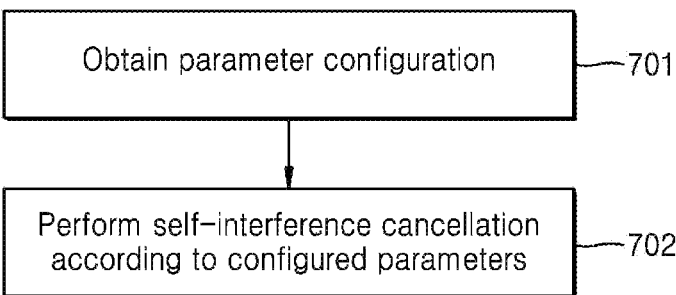
FIG. 7 illustrates a flowchart of a method for obtaining a parameter configuration for self-interference cancellation, according to an embodiment of the disclosure.

FIG. 7 illustrates a flowchart of a method for obtaining a parameter configuration for self-interference cancellation, according to an embodiment of the disclosure.

Referring to FIG. 7, the communication sensing integration device first obtains the self-interference cancellation parameter configuration in step 701.

The configuration parameters described in the embodiment can be preset or configured by the parent node of the first node in the network. If the parent node configuration method is adopted, the communication sensing integration device is a terminal, its parent node is a base station, and the configuration parameters can be configured by the base station through DCI carried by the downlink control channel (PDCCH), signaled by the base station through MAC layer signaling, and signaled by the base station through higher layer signaling.

If the communication sensing integration device is an IAB node, its parent node can be a base station accessed by the device, an IAB parent node, an IAB-donor node or other devices with base station functions, and the configuration parameters can be configured by the base station, the parent IAB node, the IAB-Donor node or other devices with base station functions through one or more of DCI, MAC layer signaling or higher layer signaling.

If the communication sensing integration device is a base station, the configuration parameters can be configured by the network.

In addition, the self-interference cancellation parameters obtained by the communication sensing integration device include at least one of the number of paths, L, for the first self-interference cancellation, the power difference δ between the linear component and the nonlinear component corresponding to the time domain baseband signal, the self-interference cancellation order P, and the power threshold adjustment parameter V. As shown in FIG. 7, in step 702, after obtaining the parameter configuration, the communication sensing integration device performs self-interference cancellation according to the obtained configuration parameters, and the communication sensing integration device can perform self-interference cancellation based on any one or a combination of the embodiments described in this disclosure. Performing initial self-interference cancellation on the time domain baseband signal includes performing initial self-interference cancellation on the time domain baseband signal based on self-interference cancellation parameter configuration information; and/or performing at least one second self-interference cancellation on the time domain baseband signal, including performing at least one second self-interference cancellation on the time domain baseband signal based on the self-interference cancellation parameter configuration information.

Figure 8:
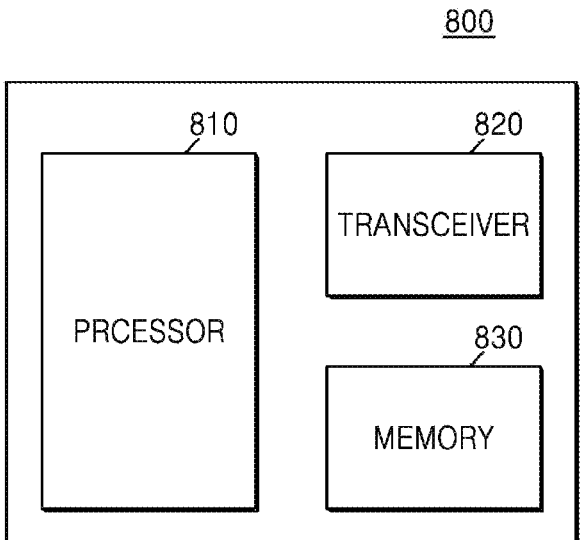
FIG. 8 illustrates a block diagram of a structure of a first node for receiving signals, according to an embodiment of the disclosure.

FIG. 8 illustrates a block diagram of a structure of a first node for receiving signals, according to an embodiment of the disclosure.

Referring to FIG. 8, the first node 800 includes processor 810, a transceiver 820 and memory 830. However, all of the illustrated components are not essential. The first node 800 may be implemented by more or less components than those illustrated in FIG. 8. In addition, the processor 810 and the transceiver 820 and the memory 830 may be implemented as a single chip according to another embodiment. The processor 810 may correspond to the processor/controller 340 of FIG. 3A or the processor/controller 378 of FIG. 3B. The transceiver 820 may correspond to the RF transceiver 310 of FIG. 3A or the RF transceiver 370a-n of FIG. 3B. The memory 830 correspond to the memory 360 of FIG. 3A or the memory 380 of FIG. 3B.

The transceiver 820 is configured to transmit and receive signals to and from the outside. The processor 810 is configured to control the transceiver to transmit/receive physical signals and perform all methods described in this disclosure. The first node 800 may be implemented in the form of hardware, software, or a combination of hardware and software to enable it to perform all the methods described in the present disclosure, and may include, but is not limited to, a UE, a gNB, a relay node, an IAB, and the like.

Figure 9:
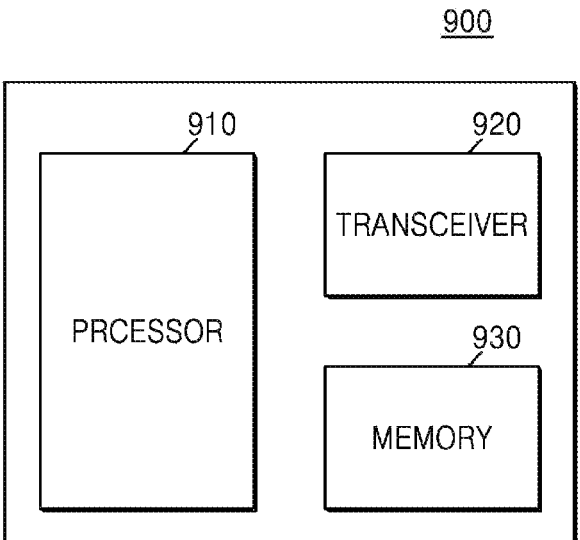
FIG. 9 illustrates a block diagram of a structure of a second node for transmitting signals, according to an embodiment of the disclosure.

FIG. 9 illustrates a block diagram of a structure of a second node for transmitting signals, according to an embodiment of the disclosure.

Referring to FIG. 9, the first node 900 includes processor 910, a transceiver 920 and memory 930. However, all of the illustrated components are not essential. The second node 900 may be implemented by more or less components than those illustrated in FIG. 9. In addition, the processor 910 and the transceiver 920 and the memory 930 may be implemented as a single chip according to another embodiment. The processor 910 may correspond to the processor/controller 340 of FIG. 3A or the processor/controller 378 of FIG. 3B. The transceiver 920 may correspond to the RF transceiver 310 of FIG. 3A or the RF transceiver 370a-n of FIG. 3B. The memory 930 correspond to the memory 360 of FIG. 3A or the memory 380 of FIG. 3B.

The transceiver 920 is configured to transmit and receive signals to and from the outside. The processor 910 is configured to control the transceiver to transmit/receive physical signals and perform all methods described in this disclosure. The second node 900 may be implemented in the form of hardware, software, or a combination of hardware and software to enable it to perform all the methods described in the present disclosure, and may include, but is not limited to, a UE, a gNB, a relay node, an IAB, and the like.

The description aims to design a digital domain self-interference cancellation method and device, in which with respect to the dynamic change characteristics of self-interference parameters in a communication sensing integration system, through initial self-interference cancellation and second self-interference cancellation. High-precision self-interference cancellation under dynamic parameters can be achieved with low hardware overhead, which provides a guarantee for the smooth detection of distant target points or weak scattering points in observation scenarios.

According to an embodiment, there is provided a method performed by a first node, the method includes performing a first self-interference cancellation on a time domain baseband signal; performing sensing-related detection on the time domain baseband signal after first self-interference cancellation; determining whether to perform a second self-interference cancellation based on a sensing-related detection result; if it is determined to perform the second self-interference cancellation based on the sensing-related detection result, performing at least one second self-interference cancellation on the time domain baseband signal.

Optionally, performing sensing-related detection on the time domain baseband signal after first self-interference cancellation includes performing power sensing on the time domain baseband signal after first self-interference cancellation; and based on a power sensing result, detecting target points requiring the second self-interference cancellation.

Optionally, the power sensing result includes corresponding power-related information at positions with different distances.

Optionally, performing power sensing on the time domain baseband signal after first self-interference cancellation includes performing frequency domain channel estimation on the time domain baseband signal after first self-interference cancellation; and performing power sensing based on a frequency domain channel estimation result.

Optionally, performing power sensing based on the frequency domain channel estimation result includes performing inverse Fourier transform on the frequency domain channel estimation result and calculating the power point by point to obtain the power sensing result.

Optionally, detecting target points requiring the second self-interference cancellation based on the power sensing result includes determining a power threshold value corresponding to the second self-interference cancellation; and based on the power sensing result and the power threshold value, detecting target points requiring the second self-interference cancellation.

Optionally, determining the power threshold value corresponding to the second self-interference cancellation includes determining a power difference between the corresponding linear components and nonlinear components of the time domain baseband signal; and determining the power threshold value corresponding to the second self-interference cancellation based on the power difference.

Optionally, determining the power difference between the corresponding linear components and nonlinear components of the time domain baseband signal includes obtaining a self-interference cancellation order; and determining the power difference between the corresponding linear components and nonlinear components of the time domain baseband signal based on the self-interference cancellation order.

Optionally, determining the power difference between the corresponding linear components and nonlinear components of the time domain baseband signal based on the self-interference cancellation order includes, if the self-interference cancellation order is a first order, determining the power difference between the corresponding linear components and nonlinear components of the time domain baseband signal based on a preset power difference or a power difference configured by a second node; and/or if the self-interference cancellation order is a second order, determining the power difference between the linear components and the nonlinear components based on a reconstructed self-interference signal corresponding to the first self-interference cancellation.

Optionally, determining the power threshold value corresponding to the second self-interference cancellation based on the power difference includes obtaining a power threshold adjustment parameter; and based on the power difference and the power threshold adjustment parameter, determining the power threshold value corresponding to the second self-interference cancellation.

Optionally, based on the power sensing result and the power threshold value, detecting target points requiring the second self-interference cancellation includes obtaining a noise floor power of the time domain baseband signal after first self-interference cancellation; based on the power sensing result, detecting target points whose power is higher than the noise floor power by at least the power threshold value; and determining the detected target points as target points requiring the second self-interference cancellation.

Optionally, determining whether to perform the second self-interference cancellation based on the sensing-related detection result includes, if it is determined that there is no target point requiring the second self-interference cancellation based on the sensing-related detection result, determining not to perform the second self-interference cancellation; and/or if it is determined that there are target points requiring the second self-interference cancellation based on the sensing-related detection result, determining to perform the second self-interference cancellation.

Optionally, performing at least one second self-interference cancellation on the time domain baseband signal includes performing at least one second self-interference cancellation on the time domain baseband signal; or performing at least one second self-interference cancellation on the time domain baseband signal after first self-interference cancellation.

Optionally, performing at least one second self-interference cancellation on the time domain baseband signal includes performing at least one second self-interference cancellation with respect to a path set corresponding to target points requiring the second self-interference cancellation and a path set corresponding to the first self-interference cancellation; and/or performing at least one second self-interference cancellation on the time domain baseband signal after first self-interference cancellation includes performing at least one second self-interference cancellation with respect to the path set corresponding to target points requiring the second self-interference cancellation.

Optionally, the method further includes receiving self-interference cancellation parameter configuration information transmitted by a second node; and performing the first self-interference cancellation on the time domain baseband signal includes performing the first self-interference cancellation on the time domain baseband signal based on the self-interference cancellation parameter configuration information; and/or, performing at least one second self-interference cancellation on the time domain baseband signal includes performing at least one second self-interference cancellation on the time domain baseband signal based on the self-interference cancellation parameter configuration information.

Optionally, receiving the self-interference cancellation parameter configuration information transmitted by the second node includes receiving the self-interference cancellation parameter configuration information transmitted by the second node through DCI, MAC signaling or higher layer signaling.

Optionally, the self-interference cancellation parameters include, at least one of, a number of paths for the first self-interference cancellation, a power difference between the corresponding linear components and nonlinear components of the time domain baseband signal, a self-interference cancellation order, and a power threshold adjustment parameter.

Optionally, the second node is a parent node of the first node.

According to another embodiment, a method performed by a first node is provided and includes receiving self-interference cancellation parameter configuration information configured by a second node; and performing self-interference cancellation based on the received self-interference cancellation parameter configuration information.

Optionally, receiving the self-interference cancellation parameter configuration information transmitted by the second node includes receiving the self-interference cancellation parameter configuration information transmitted by the second node through DCI, MAC signaling or higher layer signaling.

Optionally, self-interference cancellation parameters include, at least one of, a number of paths for the first self-interference cancellation, a power difference between the corresponding linear components and nonlinear components of a time domain baseband signal, a self-interference cancellation order, and a power threshold adjustment parameter.

Optionally, the second node is a parent node of the first node.

According to another embodiment, a first node in a wireless communication network is provided. The first node includes a transceiver configured to transmit and receive signals with the outside; and a controller configured to control the transceiver to perform any of the aforementioned methods.

Optionally, the first node is one of a terminal, an IAB node and a base station.

According to another embodiment, a method performed by a second node is provided and includes obtaining self-interference cancellation parameter configuration information for a first node performing self-interference cancellation; and transmitting the self-interference cancellation parameter configuration information to the first node.

Optionally, transmitting the self-interference cancellation parameter configuration information to the first node includes transmitting the self-interference cancellation parameter configuration information to the first node through DCI, MAC signaling or higher layer signaling.

Optionally, self-interference cancellation parameters include at least one of a number of paths for the first self-interference cancellation, a power difference between the corresponding linear components and nonlinear components of a time domain baseband signal, a self-interference cancellation order, and a power threshold adjustment parameter. Optionally, the second node is a parent node of the first node.

According to another embodiment, a second node in a wireless communication network is provided. The second node includes a transceiver configured to transmit and receive signals with the outside; and a controller configured to control the transceiver to perform any of the aforementioned methods.

Optionally, the second node is one of a base station and an IAB parent node.

Various embodiments of the present disclosure can be implemented as computer-readable codes embodied on a computer-readable recording medium from a specific perspective. A computer-readable recording medium is any data storage device that can store data readable by a computer system. Examples of computer-readable recording media may include read-only memory (ROM), random access memory (RAM), compact disk read-only memory (CD-ROM), magnetic tape, a floppy disk, an optical data storage device, a carrier (for example, data transmission via the Internet), and the like. A computer-readable recording medium can be distributed through computer systems connected via a network, and thus computer-readable codes can be stored and performed in a distributed manner. Moreover, functional programs, codes and code segments for implementing various embodiments of the present disclosure can be easily interpreted by those skilled in the art to which the embodiments of the present disclosure are applied.

It will be understood that the embodiments of the present disclosure can be implemented in the form of hardware, software, or a combination of hardware and software. Software can be stored as program instructions or computer-readable code executable on a processor on a non-transitory computer-readable medium. Examples of non-transient computer-readable recording media include magnetic storage media (e.g., ROM, floppy disk, hard disk, etc.) and optical recording media (e.g., CD-ROM, digital video disk (DVD), etc.). Non-transient computer-readable recording media can also be distributed on network-coupled computer systems, so that computer-readable codes are stored and performed in a distributed manner. The medium can be read by a computer, stored in a memory, and performed by a processor. Various embodiments may be implemented by a computer or a portable terminal including a controller and a memory, and the memory may be an example of a non-transitory computer-readable recording medium suitable for storing program(s) having instructions for implementing embodiments of the present disclosure. The present disclosure can be realized by a program having codes for concretely implementing the apparatus and method described in the claims, which is stored in a machine (or computer) readable storage medium. The program may be electronically carried on any medium, such as a communication signal transmitted via a wired or wireless connection, and this disclosure suitably includes its equivalents.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method performed by a first node, the method comprising:

obtaining a time domain baseband signal;

performing a first self-interference cancellation on the obtained time domain baseband signal;

performing power sensing on the first self-interference cancelled time domain baseband signal;

detecting target points requiring a second self-interference cancellation based on a result of the power sensing:

determining whether to perform the second self-interference cancellation based on the result of the power sensing; and in case that the second self-interference cancellation is determined to be performed, performing the second self-interference cancellation on a time domain baseband signal related to the target points.

2. The method according to claim 1, wherein the result of the power sensing includes corresponding power-related information at positions with different distances.

3. The method according to claim 1, wherein performing the power sensing on the first self-interference cancelled time domain baseband signal comprises:

performing frequency domain channel estimation on the first self-interference cancelled time domain baseband signal; and performing power sensing based on a frequency domain channel estimation result.

4. The method according to claim 3, wherein performing the power sensing based on the frequency domain channel estimation result comprises:

performing inverse Fourier transform on the frequency domain channel estimation result; and calculating the power point by point to obtain the power sensing result.

5. The method according to claim 1, wherein detecting the target points requiring the second self-interference cancellation based on the result of the power sensing comprises:

determining a power threshold value corresponding to the second self-interference cancellation, and wherein detecting the target points requiring the second self-interference cancellation based on the result of the power sensing comprises detecting the target points requiring the second self-interference cancellation, based on the result of the power sensing and the power threshold value.

6. The method according to claim 5, wherein determining the power threshold value corresponding to the second self-interference cancellation comprises:

determining a power difference between the corresponding linear components and nonlinear components of the time domain baseband signal; and determining the power threshold value corresponding to the second self-interference cancellation based on the power difference.

7. The method according to claim 5, wherein detecting the target points requiring the second self-interference cancellation further comprises:

obtaining a noise floor power of the time domain baseband signal after the first self-interference cancellation;

based on the result of the power sensing, detecting target points whose power is higher than the noise floor power by at least the power threshold value; and determining the detected target points as the target points requiring the second self-interference cancellation.

8. The method according to claim 1, wherein determining whether to perform the second self-interference cancellation based on the result of the power sensing comprises:

if it is determined that there is no target point requiring the second self-interference cancellation based on the result of the power sensing, determining not to perform the second self-interference cancellation; and if it is determined that there are target points requiring the second self-interference cancellation based on the result of the power sensing, determining to perform the second self-interference cancellation.

9. The method according to claim 1, wherein performing the second self-interference cancellation on the time domain baseband signal related to the target points comprises:

performing the second self-interference cancellation on the obtained time domain baseband signal; or performing the second self-interference cancellation on the time domain baseband signal after the first self-interference cancellation.

10. The method according to claim 9, wherein performing the second self-interference cancellation on the time domain baseband signal related to the target points further comprises:

performing the second self-interference cancellation with respect to a path set corresponding to the target points requiring the second self-interference cancellation and a path set corresponding to the first self-interference cancellation, and wherein performing the second self-interference cancellation on the first self-interference cancelled time domain baseband signal further comprises:

performing the second self-interference cancellation with respect to the path set corresponding to the target points requiring the second self-interference cancellation.

11. The method according to claim 1, further comprising:

receiving self-interference cancellation parameter configuration information transmitted by a second node, wherein performing the first self-interference cancellation on the obtained time domain baseband signal comprises:

performing the first self-interference cancellation on the obtained time domain baseband signal based on the self-interference cancellation parameter configuration information, and wherein performing the second self-interference cancellation on the obtained time domain baseband signal comprises:

performing the second self-interference cancellation on the obtained time domain baseband signal based on the self-interference cancellation parameter configuration information.

12. The method according to claim 11, wherein receiving the self-interference cancellation parameter configuration information transmitted by the second node comprises:

receiving the self-interference cancellation parameter configuration information transmitted by the second node through downlink control information (DCI), medium access control (MAC) signaling, or higher layer signaling.

13. The method according to claim 11, wherein the self-interference cancellation parameters include, at least one of, a number of paths for the first self-interference cancellation, a power difference between the corresponding linear components and nonlinear components of the time domain baseband signal, a self-interference cancellation order, or a power threshold adjustment parameter.

14. The method according to claim 11, wherein the second node is a parent node of the first node.

15. A first node in a wireless communication system, the first node comprising:

at least one transceiver;

at least one processor communicatively coupled to the at least one transceiver; and at least one memory, communicatively coupled to the at least one processor, storing instructions executable by the at least one processor to cause the first node to:

obtain a time domain baseband signal, perform a first self-interference cancellation on the obtained time domain baseband signal, perform power sensing on the first self-interference cancelled time domain baseband signal, detect target points requiring a second self-interference cancellation based on a result of the power sensing, determine whether to perform the second self-interference cancellation based on the result of the power sensing, and in case that the second self-interference cancellation is determined to be performed, perform the second self-interference cancellation on a time domain baseband signal related to the target points.

* * * * *